United States Patent [19]

Gruber et al.

[11] Patent Number: 4,939,334
[45] Date of Patent: Jul. 3, 1990

[54] METHOD FOR THE CONTROLLED WITHDRAWAL OF A COUNTERSINKING ELECTRODE IN AN ELECTROEROSION MACHINE

[75] Inventors: Hans-Peter Gruber, Losone; Renzo DeMaria, Bellinzona; Fabrizio Robbiani, Bissone; Edwin Stutz, Versico, all of Switzerland

[73] Assignee: AG Fur Industrielle Electronix Agie, Losone, Switzerland

[21] Appl. No.: 355,007

[22] Filed: May 19, 1989

[30] Foreign Application Priority Data

May 20, 1988 [DE] Fed. Rep. of Germany ....... 3817302

[51] Int. Cl.⁵ ............................................. B23H 7/26
[52] U.S. Cl. ............................. 219/69.12; 219/69.16
[58] Field of Search ................ 219/69.2, 69.16, 69.14, 219/69.17

[56] References Cited

U.S. PATENT DOCUMENTS 4,608,476  8/1986  Shimizu ............................. 219/69.2
4,733,040  3/1988  Pelloni et al. ...................... 219/69.2
4,822,970  4/1989  Levy et al. ........................ 219/69.14

Primary Examiner—A. D. Pellinen
Assistant Examiner—Geoffrey S. Evans
Attorney, Agent, or Firm—Helfgott & Karas

[57] ABSTRACT

In order to avoid unnecessarily long withdrawal movements and to eliminate as rapidly as possible short-circuits upon contact of a countersinking electrode with the workpiece being worked in the electroerosion machine, whilst also adapting as flexibly as possible the path of the withdrawal movement to the geometry of the workpiece to be eroded and the path eroded therein, the withdrawal movement of the countersinking electrode during a short-circuit is controlled so that in the presence of a short-circuit the countersinking electrode is initially moved back by a predetermined distance along the previously covered or eroded path from a short-circuit point to an intermediate point and then the electrode is moved away from the intermediate point over the given withdrawal path if there is still a short-circuit on reaching the intermediate point. A first portion of the withdrawal path is determined by a vector fixed as regards its amount and direction and, if the short-circuit is still present at tip of the vector, a further movement, which is a second portion of the withdrawal path of the countersinking electrode is provided which is displaced in parallel relative to the eroded path and is directed in the opposite direction to that described by the electrode in the eroded path during erosion.

17 Claims, 1 Drawing Sheet

METHOD FOR THE CONTROLLED WITHDRAWAL OF A COUNTERSINKING ELECTRODE IN AN ELECTROEROSION MACHINE

BACKGROUND OF THE INVENTION

The present invention relates to a method for the controlled withdrawal of a countersinking electrode in an electroerosion machine, in which in the case of a short-circuit, the countersinking electrode is moved back by a predetermined path length along the previously covered path from the short-circuit point to an intermediate point and in which the countersinking electrode on the predetermined withdrawal path is moved away from the intermediate point if a short-circuit is still present when the latter is reached.

A method for the controlled withdrawal of a countersinking electrode in an electroerosion machine is known from German Patent No. 35 25 683. Thus, if a short-circuit occurs, the countersinking electrode initially moves back along the already eroded path by a predetermined, short distance.

If the short-circuit still has not been removed at the end of this first withdrawal path, then the electrode is moved further away from the short-circuit point over a second, linear path. The latter is described by a withdrawal vector, which has a flexible direction and which is subject to the requirement of removing the electrode as quickly as possible from the short-circuit point.

Particularly in the case of long, eroded paths of limited width, such as e.g. for producing sealing or packing rings, the variable withdrawal vector has the disadvantage that its angle with respect to the side wall becomes increasingly small as a function of the already eroded path length. Therefore the countersinking electrode withdrawal can only take place in a "dragging" manner. This means that the short-circuit is either not removed or is only very slowly removed.

DE-OS No. 37 05 475 discloses an electrode return control system for an electric arc device, in which if a short-circuit state occurs, an electrode is moved away from a position in a workpiece along a path covered by the electrode for working. This publication also discloses a system, in which an object point to which the electrode is directly moved after the occurrence of the short-circuit state is advanced as the working progresses. This means that the deeper the electrode erodes into the workpiece, the deeper the point on the workpiece axis at which the withdrawal movement of the electrode takes place.

As a result of the planetary eroding movement of the countersinking electrode, in principle a path is only widened, so that in this way the countersinking electrode does not directly produce the desired path.

It is also particularly disadvantageous that when a short-circuit occurs, the electrode has produced such an abrasion in the workpiece that, due to the rounding of the electrode, a correspondingly shaped rounding is cut into the workpiece. Thus, a small edge is formed in the workpiece and is damaged on withdrawing the countersinking electrode.

SUMMARY OF THE INVENTION

It is an object of the invention to provide an improved method for the control withdrawal of a countersinking electrode of the aforementioned type so that, on the one hand, unnecessarily large withdrawal movements are avoided and, on the other hand, short-circuits are eliminated as rapidly as possible.

It must also be possible to adapt the path of the withdrawal movement as flexibly as possible to the geometry of the workpiece to be eroded and the path eroded therein.

According to the invention this and other objects are attained by a controlled withdrawal method, in which the withdrawal path is determined by a vector of fixed amount and direction. If the short-circuit is still present at the tip or apex of the vector, the countersinking electrode is guided in its further movement parallel to the eroded path and in the opposite direction to that described by the countersinking electrode in the eroded path during erosion.

This has the advantage that in the case of a path erosion, after encountering the short-circuit, the countersinking electrode can leave the eroded path as rapidly as possible, and it is simultaneously possible to establish to what extent the withdrawal direction is restricted by other workpiece shapes. This is particularly necessary if the withdrawal of the countersinking electrode has to be performed in relatively complicated geometrical structures, e.g. in workpieces used for the production of sealing rings, where the path erosion direction can be subject to considerable modifications.

The aforementioned problem is also solved in that the further withdrawal path of the countersinking electrode comprises at least two directly interlinked withdrawal movements.

This in particular has the advantage that irregularly occurring obstacles, e.g. due to the shape of the workpiece can be bypassed with optimum path utilization, when describing a countersinking electrode path on the withdrawal path.

In an advantageous method according to the invention, the vector determining the withdrawal path is fixed with respect to an absolute coordinate system. This has the special advantage that the withdrawal path can be more easily adapted to the workpiece contours bounding it.

In an embodiment of the inventive method, at least two vectors defined in the fixed manner with respect to amount and direction determine the withdrawal path as a function of the workpiece geometry and, on changing from one vector to the other, only the tips of the vectors are interconnected for the countersinking electrode withdrawal path to be covered and the further movement of the electrode otherwise takes place parallel to the eroded path.

This has the advantage that obstacles impeding the withdrawal path can be bypassed by shortening a vector.

In a further advantageous embodiment of the inventive method, after removing the short-circuit on the withdrawal path, the countersinking electrode is again fed to the point on the workpiece where the short-circuit first occurred.

The particles resulting from the erosion process sediment are in the eroded path. If the countersinking electrode movement again passes along this eroded path curve, there is a risk that these particles would be rubbed into the sides or bottom of the path curve, so as to destroy the eroded faces thereof. Such a surface destruction is avoided by the withdrawal of the electrode according to this invention.

According to another advantageous embodiment of the method a "point" withdrawal movement (the individual withdrawal movement will be explained hereinafter) is linked with the "default" withdrawal movement and in a further advantageous embodiment the "point" withdrawal movement is linked with a further "point" withdrawal movement.

In another advantageous embodiment of the inventive method the "point" withdrawal movement is linked with the "vector" withdrawal movement and another advantageous embodiment a "point" withdrawal movement is linked with a "planetary" withdrawal movement.

In a further advantageous embodiment of the inventive method the "vector" withdrawal movement is linked with the "default" withdrawal movement and in another advantageous embodiment the "vector" withdrawal movement is linked with a further "vector" withdrawal movement.

In yet another advantageous embodiment of the method the "vector" withdrawal movement is linked with the "planetary" withdrawal movement.

Advantageously, in a further embodiment of the inventive method interconnected withdrawal movements are linked with each other.

In another advantageous embodiment of the inventive method an additional double timer movement is superimposed on a conventional single timer movement of the countersinking electrode along the withdrawal path and the double timer movement advantageously lasts longer than the single timer movement.

A so-called double timer movement is explained in German patent application No. P 36 44 042.6 corresponding to U.S. Pat. No. 4,822,970. It consists of one or more short-stroke raising/lowering movements of the tool electrode relative to the workpiece performed in the dielectric relative to first raising/lowering movements (single timer movements).

The invention is described in greater detail hereinafter relative to non-limitative embodiments and the attached drawings.

DETAILED DESCRIPTION OF THE PREFERRED EMBODIMENTS

Figure 1:
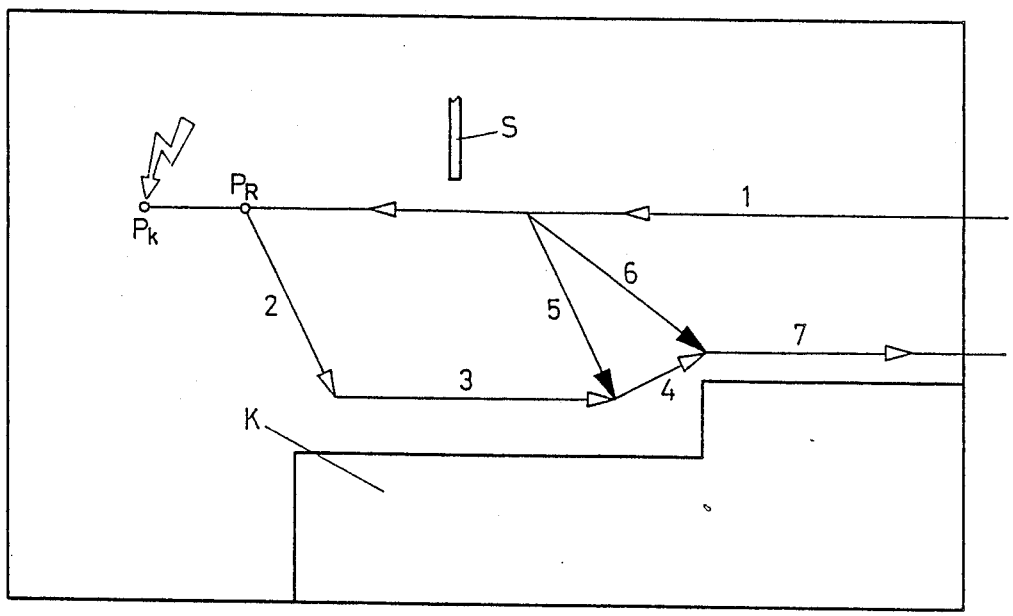
FIG. 1 is a diagram showing the path of a countersinking electrode along the withdrawal path of the electrode in the case of the occurrence of a short-circuit according to the invention, use being made of different vectors.

FIG. 1 shows the movement path of a countersinking electrode S along a path 1 in a workpiece. Unlike in the case of planetary erosion, the shape to be eroded is directly produced by the movement of countersinking electrode S in path 1. This type of erosion is particularly advantageous in the case of shaped articles, such as e.g. sealing rings. However, a short-circuit can occur, if the countersinking electrode S is in direct contact with the workpiece.

Since during the erosion process, the countersinking electrode S erodes small particles out of the workpiece and these particles are still located in the dielectric in which the complete erosion process takes place, it is also possible for such an unfavorable positioning of these particles between workpiece and electrode that a short-circuit occurs at a location $P_k$, the resistance in the dielectric dropping towards zero. In order to be able to remove this short-circuit, there must be a withdrawal movement of countersinking electrode S which, according to the invention, can be subdivided into several portions.

Firstly the countersinking electrode S is withdrawn by a short distance along the previously covered path 1, so as to ensure that the rounding eroded in the workpiece does not hinder the movement of the countersinking electrode during its withdrawal for removing the short-circuit. This rounding is formed because the countersinking electrode erodes its own shape into the workpiece. Thus, a type of edge is formed in the workpiece which would be damaged in the case of a lateral withdrawal movement of countersinking electrode S. This is undesirable since high precision is required for the parts to be formed.

If the short-circuit has still not been removed at point $P_R$ of the withdrawal movement, it is followed by a further movement along a first portion (2) of the withdrawal path along a vector spatially predetermined in length and direction. This vector can be defined beforehand by the operating personnel and its amount and direction are in particular, are dependent on the environment of the workpiece limiting the movement.

As for all withdrawal movements advantageously the short-circuit should be removed as rapidly as possible, and to achieve this, it is necessary that the countersinking electrode S be speedily removed from the workpiece surfaces.

However, if the further withdrawal movement is limited by the geometry of an obstacle K, which in the present case is part of the workpiece, it is not possible for the movement of countersinking electrode S in the direction of the vector to be carried out by the predefined length amount for the first withdrawal path portion 2, because this might lead once again to a short-circuit.

Thus, if the short-circuit is still present a movement of the countersinking electrode S along a second portion 3 of the withdrawal path is connected to the tip of the vector for the first portion 2 of the withdrawal path. Portion 3 is parallel to the eroded path 1 and is directed opposite to the direction described by the electrode in the eroded path 1 during erosion.

If it is necessary, as a result of the geometry of obstacle K of the workpiece for the previously described vector 2 to undergo a change, then the further movement of the countersinking electrode S is directed along a third portion 4 of the withdrawal path fixed by the tips of the two predetermined vectors 5 and 6. As regards the length and amount, vector 5 corresponds to withdrawal path vector 2, but is offset in parallel therefrom.

Such a transition movement can in particular occur if the workpiece obstacle K makes it necessary as a result of its geometry, such as e.g. the edge of body K in FIG. 1.

If countersinking electrode S has reached the end of vector 6 and the short-circuit has still not been removed, then the further movement of electrode S takes place along a fourth portion 7, which is once again parallel to the eroded path 1.

Prior to the eroding process, the operating personnel can define the amount and direction of vectors 2 (5) and 6 as a function of the obstacle K. Errors in connection with said determination are virtually impossible, because the vectors set up parallelograms, whose surfaces can clearly not be brought into contact with obstacle K, so as to ensure a short-circuit-free withdrawal of the countersinking electrode.

If the direction of the path to be eroded changes by an angle of approximately 90°, then the operating personnel immediately recognizes, in the case of a constant amount and direction of the vector in space, whether a different withdrawal vector choice is necessary to permit a possible withdrawal path to be obtained.

Along predetermined distances of the path to be covered during erosion, the vector determining the first portion 2 of the particular withdrawal path is fixed with respect to the absolute coordinate system.

For explanation, it is pointed out here that the further existence of the short-circuit during the complete withdrawal movements is constantly checked, i.e. not only at the points at which the change of movement takes place.

If the short-circuit has now been removed at point $P_k$, then countersinking electrode S is not returned directly to the eroded path 1 and instead moves along the previously covered withdrawal path from the aforementioned point back towards point $P_R$ at which the countersinking electrode S was located when the short-circuit state was removed. From there, it moves a short distance along the eroded path back to short-circuit point P.

If the countersinking electrode were returned along the eroded path 1, the serious problems would occur with already eroded particles. Following the erosion process, these particles sediment in the dielectric in the eroded path 1 and are not flushed away. If the electrode were to travel on the already covered path 1, then these particles could scratch the workpiece faces. This is prevented by a movement of the countersinking electrode along the withdrawal path to the short-circuit point.

In the case of geometrically complicated workpieces, it can also be advantageous to interlink several withdrawal movements, so as to remove the short-circuit as rapidly as possible.

In order to further illustrate the possible links, the established withdrawal methods will now be explained:

"Default" withdrawal movement.

This is the standard withdrawal movement of a countersinking electrode along the previously eroded path and away from short-circuit point $P_k$.

"Point" withdrawal movement.

For this purpose firstly a point is determined and following each initiation of the withdrawal movement from each short-circuit location, there is a linear movement towards this point.

"Vector" withdrawal movement.

In this method an incremental vector is allocated to the withdrawal movement and the further movement parallel to the previously covered path has already been described for FIG. 1.

"Planetary" withdrawal movement.

This withdrawal movement is only suitable for systems in which planetary erosion takes place. For this purpose, a point is fixed, usually on the axis of a cylinder or similar hollow body to be eroded, together with a given length L as the distance of said point from the bottom of the hollow body. If a short-circuit occurs, then the withdrawal movement automatically takes place in the direction of the previously fixed point of the axis at the distance L from the bottom of the hollow body and then along the axis and out of the hollow body, if the short-circuit has not been removed by then.

There are several possibilities for interlinking the individual withdrawal movements. Obviously the links described hereinafter can be further linked to one another.

Figure 2A:
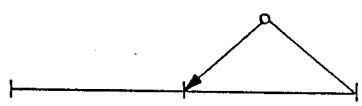
FIGS. 2a–2d diagrammatically show the linking of established withdrawal movements with the "point" withdrawal movement.

FIGS. 2a, 2b, 2c, 2d show the links or connections of the individual withdrawal movements with the "point" withdrawal movement. In the case of the linking of the "point" withdrawal movement with the "default" withdrawal movement, there is a linear movement to the end of the last withdrawal point at which the "default" withdrawal movement began (FIG. 2a).

Figure 2B:

On linking the "point" withdrawal movement with a further "point" withdrawal movement, there is a linear movement to the point predetermined first in the preceding withdrawal movement (FIG. 2b).

Figure 2C:

On linking the "point" withdrawal movement with the "vector" withdrawal movement, there is a linear withdrawal movement to the point determined by the end of the last withdrawal point, displaced by the given vector (FIG. 2c).

Figure 2D:

On linking the "point" withdrawal movement with the "planetary" withdrawal movement, there is a linear movement to the end of the last withdrawal point at which the "planetary" withdrawal movement applied (FIG. 2d).

Figure 3A:
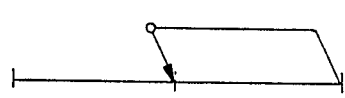
FIGS. 3a–3d diagrammatically show the linking of established withdrawal movements with the "vector" withdrawal movement.

FIGS. 3a, 3b, 3c and 3d show the connection of the known and previously explained withdrawal movements with the "vector" withdrawal movement. On linking the "vector" withdrawal movement with the "default" withdrawal movement, there is a linear movement to the end of the last withdrawal point for which the "default" withdrawal movement applied (FIG. 3a).

Figure 3B:

For linking the "vector" withdrawal movement with the "point" withdrawal movement, the linear movement takes place to the point predetermined in the last withdrawal movement (FIG. 3b).

Figure 3C:
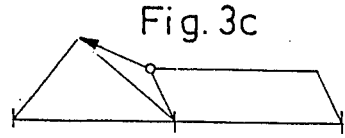

For linking the "vector" withdrawal movement with a further "vector" withdrawal movement, there is a linear movement to the point determined in the last, preceding withdrawal movement, displaced by the vector (FIG. 3c).

Figure 3D:
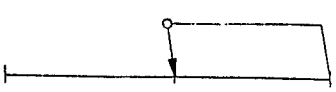

For linking the "vector" withdrawal movement with the "planetary" withdrawal movement, the linear movement takes place to the end of the last withdrawal point for which the "planetary" withdrawal movement applied (FIG. 3d).

A timer movement can be simultaneously coupled with these withdrawal movements. In the case of a single timer, in the known manner, in predetermined time intervals the countersinking electrode S is drawn out of the workpiece by a small distance, so that the particles which have occurred during the erosion process can be flushed away. The speed during the timer movement is much higher than the speed of the countersinking electrode S during withdrawal. As the single timer movements are relatively short and the distance between workpiece and countersinking electrode S relatively small, so that there is only a weak flushing or washing away of the eroded particles, a longer withdrawal movement must be created. This is made possible by a so-called "double timer", which passes along a much longer path and consequently increases the distance between the workpiece and the countersinking electrode S, so that the dielectric can be flushed or washed in a completely satisfactory manner. The nature of the programming of the double timer permits timer movements of different lengths.

There has been disclosed heretofore the best embodiment of the invention presently contemplated. However, it is to be understood that various changes and modifications may be made thereto without departing from the spirit of the invention.

What is claimed is:

1. In a method for controlled withdrawal of a countersinking electrode in an electroerosion machine in which the countersinking electrode is moved relative to a workpiece along an eroded path, the method comprising the steps of initially moving the countersinking electrode, in the case of a short-circuit, back by a predetermined distance along a previously covered path from a short-circuit point to an intermediate point, and moving the countersinking electrode away from the intermediate point over a given withdrawal path if the short-circuit is still present on reaching the intermediate point, the improvement comprising determining a first portion of the withdrawal path by a vector with fixed defined amount and direction in space and if the short-circuit is still present at said vector's tip, performing a further movement including a second portion of the withdrawal path of the countersinking electrode (S), said second portion being displaced in parallel relative to the eroded path and being directed in the opposite direction to that described by the electrode in the eroded path during erosion.

2. Method according to claim 1, wherein along predetermined distances of the path to be covered during erosion, the vector determining the first portion of the withdrawal path is fixed with respect to an absolute coordinate system.

3. Method according to claim 2, wherein a second vector (S) is chosen as a function of workpiece geometry, the tips of the two vectors defining in a fixed manner the magnitude and direction of the second portion of the withdrawal path.

4. Method according to claim 3, wherein at the end of the movement defined by the workpiece geometry along the second portion there is a path movement of said electrode along a third portion in the direction of a vector tip of a further, fixed defined vector (6) and if the short-circuit still exists when the countersinking electrode (S) has reached a tip of the further fixed defined vector (6), the further movement of the electrode (S) along a fourth portion again takes place in a parallel displaced manner relative to the eroded path and in the opposite direction to that described by the countersinking electrode (S) in the eroded path during erosion.

5. Method according to claim 4, wherein, following the removal of the short-circuit, the countersinking electrode (S) is again moved to a location ($P_k$) at which the short-circuit first occurred, which is when a composite withdrawal path has been covered.

6. Method according to claim 1, wherein an additional double raising-and-lowering movement of said electrode is superposed on a conventional, single raising-and-lowering movement of the countersinking electrode (S) along the withdrawal path.

7. Method according to claim 6, wherein the duration of the double raising-and-lowering movement exceeds that of the single raising-and-lowering movement.

8. In a method for the controlled withdrawal of a countersinking electrode in an electroerosion machine in which the countersinking electrode is moved relative to a workpiece along an eroded path during erosion, the method comprising the steps of initially moving the countersinking electrode in the case of a short-circuit back by a predetermined distance along a previously covered path from a short-circuit point to an intermediate point, and moving the countersinking electrode away from the intermediate point over the given withdrawal path if a short-circuit is still present on reaching the intermediate point, the improvement comprising moving the countersinking electrode back along the withdrawal path with at least two directly linked withdrawal movements.

9. Method according to claim 8, wherein a point withdrawal movement is linked with a vector withdrawal movement.

10. Method according to claim 8, wherein a point withdrawal movement is linked with a planetary withdrawal movement.

11. Method according to claim 8, wherein a vector withdrawal movement is linked with a default withdrawal movement.

12. Method according to claim 8, wherein a vector withdrawal movement is linked with a vector withdrawal movement.

13. Method according to claim 8, wherein a vector withdrawal movement is linked with a planetary withdrawal movement.

14. Method according to claim 8, wherein a point withdrawal movement is linked with a default withdrawal movement.

15. Method according to claim 8, wherein a point withdrawal movement is linked with a point withdrawal movement.

16. Method according to claim 8, wherein an additional double raising-and-lowering movement of said electrode is superposed on a conventional, single raising-and-lowering movement of the countersinking electrode (S) along the withdrawal path.

17. Method according to claim 16, wherein the duration of the double raising-and-lowering movement exceeds that of the single raising-and-lowering movement.

* * * * *